United States Patent Office 3,314,382
Patented Apr. 18, 1967

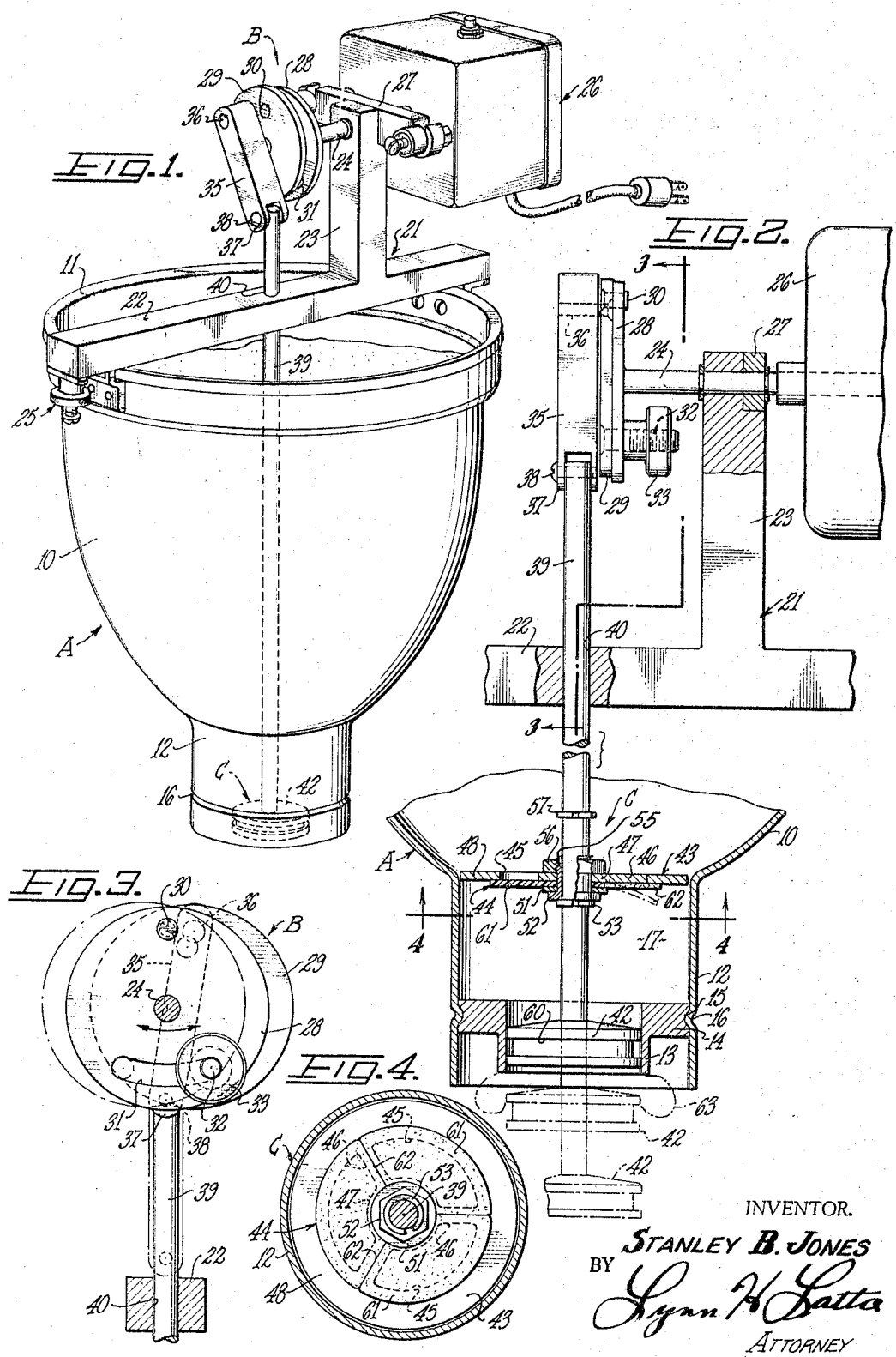

3,314,382
DOUGH RING FORMING AND DROPPING APPARATUS
Stanley B. Jones, Torrance, Calif., assignor to Hol'N One Donut & Supply Co., Los Angeles, Calif., a corporation of California
Filed July 13, 1964, Ser. No. 381,962
8 Claims. (Cl. 107—14)

This invention relates to apparatus for extruding rings of doughnut dough and for dropping them into a cooking vat, devices of this kind being commonly referred to as "doughnut dropper." The general object of the invention is to provide an improved, simplified doughnut dropper wherein a dough ring-forming head and a dough-extruding piston are mounted on a common operating axis in axially spaced relation for vertically reciprocating movements of the piston in the extrusion throat of a dough hopper and of the forming head in a discharge nozzle at the lower end of said throat, the piston being operative on its down stroke to force the dough downwardly through the discharge nozzle and around the forming head so as to provide a ring of dough flowing around the periphery of the head, and the head being operative on its up-stroke to shear off this ring of dough against the lower end of the nozzle so that the dough ring will drop into a cooking vat below the dropper. The improved dropper of my invention further includes a valve providing for flow of dough downwardly past the piston during the upstroke thereof, thereby replenishing the supply of dough in the extrusion throat, and, at the commencement of the next downstroke, closing the piston so as to make it effective to force the dough downwardly in the throat. Specifically, the invention aims to provide such a dropper:

(1) Wherein the valve "floats" and has maximum sensitivity of response to the reversal of direction of piston movement so as to close the piston immediately after such reversal;
(2) Wherein the freedom of movement of the valve is not affected by dough clinging to the operating rod;
(3) Which is of maximum simplicity in construction;
(4) Wherein the valve is secured to the underside of the piston and carried thereby;
(5) Wherein the valve consists essentially of a thin flexible disc in contact with the underface of the piston;
(6) Having novel and improved means for adjusting the stroke of the operating rod.

Other objects and advantages will become apparent in the ensuing specification and appended drawing in which:

FIG. 1 is a perspective view of a doughnut dropper embodying the invention;
FIG. 2 is a fragmentary side elevational view of the same with portions broken away and shown in section;
FIG. 3 is a vertical sectional view looking at the rear side of the operating eccentric taken as indicated by the line 3—3 of FIG. 2; and
FIG. 4 is a horizontal transverse sectional view through the extrusion throat looking upwardly at the underside of the valve as indicated by the line 4—4 of FIG. 2.

Referring now to the drawing in detail, I have shown therein, as an example of one form in which the invention may be embodied, a doughnut dropper comprising a hopper A; a driving unit B mounted on the rim of the hopper A; and a combined extrusion piston and ring-forming head assembly C (FIG. 2) operable in the lower portion of the hopper A.

Hopper A comprises a bowl 10 having a rim 11 at its upper end and a cylindrical extrusion throat 12 at its lower end. An extrusion nozzle 13 is formed with an integral collar 14 having a peripheral groove 15 locked to an annular bead 16 which is rolled or pressed inwardly from the wall of throat 12. Above the collar 14, within the throat 12, is an extrusion chamber 17 which is adapted to receive dough flowing downwardly from the hopper bowl 10.

Driving unit B comprises an inverted T-bracket 21 having a horizontal base bar 22 bridging across the rim 11 of hopper A, and having an upwardly projecting post 23 provided at its upper end with a suitable bearing bushing in which is journalled a drive shaft 24. Post 23 is located intermediate the vertical axis of hopper A and rim 11. Suitable attachment means 25 which, being conventional, is not fully illustrated, is provided for detachably anchoring the ends of the base bar 22 to opposite sides of the hopper rim 11. Shaft 24 is driven by an electric motor 26 mounted upon a T-bar 27 on the upper end of post 23. Motor 26 is disposed on the side of post 23 remote from the hopper axis. On the end of shaft 24, which projects substantially to said axis, is secured a driving flange 28. An eccentric disc 29 is attached by means of a pivot 30 to one side of disc 28 (FIG. 3). Disc 28 is provided with an arcuate slot 31 formed as a segment of a circumference concentric with pivot 30. A threaded stud 32, secured in eccentric disc 29, projects rearwardly through the slot 31 and is provided with a flange nut 33 adapted to be tightened against the driving disc 28 to clamp the eccentric disc 29 thereto in selected positions of adjustment in which the eccentric disc 29 is swung arcuately about the pivot 30.

A pitman bar 35 is attached to the forward face of eccentric disc 29 by means of a pivot 36 having an eccentricity, with reference to the rotational axis of shaft 24, which can be adjusted by the swinging adjustment of eccentric disc 29 described above, thereby varying the throw or stroke of the pitman bar 35. At its opposite end, pitman bar 35 has a clevis 37 which is connected by a pivot 38 to the upper end of an actuator rod 39 forming part of the actuator assembly C.

In the position of the disc 29 shown in full lines in FIG. 3, the pitman pivot 36 is at maximum eccentricity to provide maximum stroke; whereas in the position shown in phantom by dot-dash lines, it has minimum eccentricity to provide minimum stroke.

Actuator assembly C comprises the rod 39 which is slidable vertically in a bearing bore 40 (FIG. 2) in the bracket base bar 22; a ring-forming head 42 detachably threaded onto the lower end of rod 39; a piston 43 in the form of a flat rigid circular disc having its periphery fitted closely to the inner wall of throat 12 but with a free-sliding fit; and a valve disc 44 of flexible sheet material abutting the underface of piston 43 and adapted to close a circular array of segmental, arcuate valve openings 45 in the piston 43. The valve openings 45 have adjacent, opposed ends separated by spokes 46 which join a hub portion 47 of the piston 43 to a circumferentially continuous circular rim portion 48 thereof.

The valve disc 44 is seated upon a washer 51 which is carried by a hexagon-headed bushing 52 slidable vertically on the rod 39. A snap ring 53 mounted in an annular groove in the lower end portion of rod 39, is utilized as a limiting stop to determine a lower limit position of sliding movement of the bushing 52.

Bushing 52 pierces the valve 44 and piston 43 to provide a common mounting for these parts, on which they will "float" vertically as actuator rod 39 is reciprocated. Piston 43 is clamped against the central portion of the valve disc 44 by means of a securing nut 56 threaded onto a threaded upper end portion 55 of bushing 52. A snap ring 57, mounted in an annular groove in the rod 39 above threaded portion 55, provides a stop to determine an upper limit position of sliding movement of bushing 52.

The forming head 42 is fitted closely within the nozzle 13 with just sufficient clearance to permit free vertical sliding movement therein. It is provided with a peripheral groove 60 which becomes filled with a ring of dough functioning as a gasket which seals the space between the forming head and the nozzle. On the upstroke it prevents air from entering the chamber 17 from below, whereby adequate suction is developed in the chamber 17 for recharging as described hereinafter.

Valve disc 44 includes a circumferentially continuous hub portion having a central aperture through which the actuator rod 39 projects, and a plurality of segmental flaps 61 which are separated by radial slits 62 registering with the radial axes of the spokes 46. Peripheral portions of the valve flaps 61 overlap the continuous rim portion 48 of piston 43. The circumferential extremities of flaps 61 overlap the respective spokes 46. In the closed position of the valve, these overlapping peripheral and circumferential extremities of the valve flaps 61 are seated against the rim portion 48 and the spokes 46 of the piston 43 and thus are supported sufficiently so that the flaps 61 will not be pushed upwardly into the apertures 45.

In operation, the forming head 42 and extrusion piston 43 are reciprocated vertically by the pitman action of eccentric disc 29 and pitman bar 35 transmitted to the upper end of rod 39, between upper limit positions which are shown in full lines in FIG. 2 and lower limit positions which are shown in phantom in that figure. In the upper limit position, the forming head 42 is in the lower extremity of nozzle 13 with its lower face in a plane slightly above the lower end of nozzle collar 14, and the piston 43 is at the upper extremity of extrusion chamber 17 as shown in full lines. As the downward stroke commences, the rod 39 will slide downwardly through piston 43 (the piston floating) until stop ring 57 engages the upper end of bushing 52, when the piston 43 will start to move downwardly. The valve disc 44 will then immediately seat upwardly against the piston 43, closing the valve openings 45 and cooperating with the piston 43 to provide, in effect, an imperforate plunger which forces the dough within chamber 17 downwardly causing it to follow the downward movement of head 42. The downward stroke of piston 43 will commence when the forming head 42 starts to emerge from the lower end of nozzle 13, when the dough, under the pressure applied by piston 43, will be extruded outwardly between the lower end of the nozzle 13 and the head 42 to form a dough ring which is indicated in phantom at 63. As the piston 43 completes its downward stroke, a dough ring of selected volume (as determined by the length of stroke selected by adjustment of eccentric disc 29) is attained. As the upstroke of rod 39 commences, it will slide through piston 43 until lower stop ring engages bushing 52 and starts the upstroke of the piston 43. At this point on the upward stroke, the forming head 42 will reenter the nozzle 13 and shear off the dough ring 63, which will then drop into a suitably positioned cooking vat. At the same time the forming head 42 will seal the nozzle 13 with a plugging action and as the upward stroke continues, because of the differential between the areas of nozzle 13 and chamber 17 respectively, the further upward movement of piston 43 will result in an expansion in the aggregate volume of chamber 17 and the space within nozzle 13 above the head 42, thus creating a suction which will draw fresh dough into the chamber 17 through the valve openings 45, the valve flaps 61 yielding downwardly as indicated in phantom in FIG. 2. Thus, the supply of dough within the chamber 17 will be replenished and at the upper limit of the piston stroke the chamber will be at maximum volume and filled with dough. As the down stroke commences, piston 43 will again float until engaged by stop ring 57, and will then be forced downwardly, its pressure applied against the body of dough within the chamber 17 resulting in the immediate closing of valve flaps 61 over valve openings 45 as previously described. This completes the cycle of operation of the apparatus.

In previous doughnut droppers wherein an extrusion piston is fixed to an actuator rod and a rigid valve disc is slidable vertically on the actuator rod, the piston must move downwardly through the body of dough in the extrusion throat until it closes against the valve, thus causing part of the dough to return through the piston to its upper side. A longer stroke is therefore required for extruding a given volume of dough, and a substantial amount of power is lost. Furthermore, the clinging of dough to the rod interferes with free sliding movement of the valve on the rod and results in a sluggish action and a substantial amount of lost motion on the part of the extrusion piston. The amount of lost motion will vary in accordance with variations in the extent of clogging of the slide bearing of the valve by the dough clinging to the actuator rod, making it difficult to maintain uniform volume in the extruded dough ring. The process of cleaning such apparatus after a period of use is somewhat laborious and time consuming.

The present invention provides a distinct improvement over such prior apparatus in that the highly flexible valve disc 44 will close almost instantaneously at the beginning of each downstroke of the piston, thus immediately commencing the extrusion operation and eliminating the reverse flow and power losses referred to above. Furthermore, since the valve disc 44 does not slide on the rod 59, it eliminates the problem of clogging of a slide bearing and provides uniformity in the extrusion volume. Also, considerably greater ease of cleaning the extrusion mechanism C after a period of use, is provided. Normally, cleaning is effected by removing the motor 26, detaching the bracket 21 from the hopper A, and cleaning the entire assembly of driving unit B and extrusion forming mechanism C (as by washing) without detaching these parts from the actuator rod 39.

In the extrusion of dough, the differential in area of piston 43 over forming head 42 will effect a reduction in the volume of chamber 17, causing the dough to be extruded past the head 42 despite the fact that it is moving downwardly at the same speed as piston 43.

I claim:

1. A dough ring former and dropper comprising: a hopper having at its lower end a cylindrical extrusion throat and a coaxial cylindrical discharge nozzle of smaller diameter than said throat at the lower end thereof; an extrusion piston reciprocable in said throat, said piston having a valve opening therein; a flexible valve flap having an extremity secured to the underside of said piston and a body portion adapted to close said valve opening and to overlap and seat against the marginal areas of the underface of said piston around said opening in response to downward movement of said piston against a body of dough in said throat, whereby to move said dough downwardly into said nozzle; a forming head reciprocable in said nozzle; and means on which said piston and head are mounted in axially spaced relation, said means being reciprocable vertically in said throat and nozzle to move said piston and head downwardly in said throat and nozzle respectively, applying pressure to said dough, to a lower limit position of said head in which it is projected out of said nozzle whereby said piston will effect extrusion of dough out of said nozzle and around said head in the form of a ring and then to move said piston and head upwardly whereby said head will reenter said nozzle, shear off said ring, and close the lower end of said throat so that further upward movement of said piston will create within said throat a suction causing dough to be drawn downwardly from above said piston through said valve opening into said throat.

2. A dough ring former and dropper comprising: a hopper having at its lower end an extrusion throat and a discharge nozzle of smaller diameter than said throat at the lower end thereof; driving means carried by said hopper for imparting reciprocating movement; an actuator rod reciprocated by said driving means vertically in said hopper and throat; an extrusion piston and an adjacent flexible valve flap carried by said actuator rod, said piston having a valve opening therein and said valve flap having an extremity secured to said piston and a body portion adapted to close said valve opening and to overlap and seat against the marginal areas of the underface of said piston around said opening in response to downward movement of said piston against a body of dough in said throat, whereby to move said dough downwardly into said nozzle; a forming head secured to the lower end of said rod in downwardly spaced relation to said piston and reciprocable in said nozzle to a lower limit position in which it is projected below said nozzle whereby pressure applied to dough in said throat by said piston while moving downwardly within said throat will extrude the dough through said nozzle and around said head in the form of a ring which will be sheared off by said head upon return movement into said nozzle, said valve flap flexing downwardly relative to said piston in response to upward movement of said piston whereby the dough above said piston will flow downwardly through said valve opening into said throat.

3. A dough ring former and dropper comprising: a hopper having at its upper end a rim and at its lower end a cylindrical extrusion throat and a discharge nozzle of smaller diameter than said throat partially closing the lower end thereof; driving means detachably mounted upon said rim; an actuator rod disposed on the major axis of said hopper and having at its upper end a connection to said driving means whereby it is reciprocated vertically when said driving means is operated; a piston of circular disc form having a plurality of circumferentially spaced apertures and a hub mounted for limited sliding movement on said rod, said piston being slidably fitted within said throat; a flexible valve disc having a central portion secured to the underside of said piston and a plurality of circumferentially separated flexible valve flaps adapted to seat against the under face of said piston in covering relation to respective valve apertures in response to downward movement of said piston against a body of dough within said throat and to yield downwardly relative to said piston in response to upward movement of said piston so that dough from above said piston may flow downwardly through said valve apertures to replenish said body of dough in the throat; and a forming head slidably fitted within said nozzle and secured to the lower end of said rod in downwardly spaced relation to said piston such as to be projected below said nozzle as said piston commences a downward stroke, whereby dough forced downwardly by said piston will be extruded through said nozzle and around said head to form a dough ring which will be sheared off by said head upon return upward movement into said nozzle.

4. A dough ring former and dropper comprising: a hopper having at its lower end a cylindrical extrusion throat and a cylindrical discharge nozzle of smaller diameter than said throat partially closing the lower end thereof; driving means carried by said hopper for imparting reciprocating movement; an actuator rod disposed on the major axis of said hopper and connected to said driving means to receive said reciprocating movement therefrom; an extrusion piston in the form of a circular disc slidably fitted within said throat, said rod sildably extending through the center of said piston and having vertically spaced stops for alternately engaging and transmitting lost motion movement to said piston, said piston having a plurality of circumferentially spaced valve openings; a valve disc of flexible sheet material having a central portion secured to the underside of said piston at the center thereof and having a plurality of circumferentially spaced flexible flaps engageable with the underface of said piston in closing relation to the respective valve openings therein in response to downward movement of said piston against a body of dough in said throat, whereby said piston may be effective to apply downward pressure against said dough; and a forming head slidably fitted in said nozzle and secured to the lower end of said rod in downwardly spaced relation to said piston and valve disc such as to be projected below said nozzle as the downward stroke of said piston commences, whereby the pressure of the latter against said body of dough will effect extrusion of the dough through said nozzle and around said head to form a dough ring which will be sheared off upon reentry of said head into said nozzle during upward stroke of said rod, said valve flaps yielding downwardly relative to said piston in response to suction created within said throat by upward movement of the piston following the closing of said nozzle by said reentry of said head therein, whereby dough above said piston will be drawn downwardly through said valve openings into said throat.

5. A dough ring former and dropper as defined in claim 4, wherein said piston comprises a central hub portion through which said rod extends, a circumferentially continuous rim portion fitted to said throat, and a plurality of radial spokes joining said rim portion to said hub portion, whereby said valve openings are of sector shape separated by said spokes; and wherein said valve flaps are of sector shape conforming to the shape of said openings but of larger area so as to have marginal portions adapted to seat against the marginal portions of said piston defining said valve opening, said flaps having adjacent radial side edges separated by radial slits in said valve disc.

6. A dough ring former and dropper as defined in claim 5, including a bushing slidable on said rod, and an anular securing means encirculing and secured to said bushing above and below the central portions of said piston and valve disc respective and clamping said central portions against one another.

7. A dough ring former and dropper comprising: a hopper having at its lower end an integral tubular cylindrical extrusion throat; a cylindrical discharge nozzle of smaller diameter than said throat, said nozzle having an integral radially projecting collar secured within a lower portion of said throat and partially closing the same, said nozzle projecting downwardly from said collar; driving means carried by said hopper for imparting reciprocating movement; an actuator rod reciprocated by said driving means on the vertical axis of said hopper; an extrusion piston of circular disc form including a hub through which said rod extends, said hub being mounted for lost motion sliding movement on said rod above the lower end thereof, said piston having a plurality of circumferentially spaced valve openings and being fitted within said throat for vertically sliding movement therein; a valve disc having a central portion secured to said piston in contact with its underface and including flexible valve flaps radiating from its said central portion bneath the respective valve openings and engageable with the underface of said piston to close said valve openings in response to downward movement of the piston against a body of dough in said throat; and a forming head secured to the lower end of said rod in downwardly spaced relation to said piston and valve disc and fitted in said nozzle for reciprocating movements in unison with reciprocating movements of said piston, such as to project said head below said nozzle as the piston begins a downward stroke in which pressure is applied to said body of dough, as the result of which dough will be extruded downwardly through said nozzle and around said head to form a ring which will be sheared off by reentry of said head into said nozzle during upward stroke of said piston; said valve flaps being yieldable downwardly relative to said piston in response to suction created in said throat by upward movement of said piston following the closing of said nozzle by said head reentry, whereby dough above said piston will flow downwardly through said valve openings into said throat to replenish said body of dough therein.

8. A dough ring former and dropper comprising: a hopper having at its upper end a rim and at its lower end a cylindrical extrusion throat and a coaxial cylindrical discharge nozzle of smaller diameter than said throat and partially closing the lower end thereof; a bracket including a bridge bar having means at its ends for detachably securing the same to said rim in diametrically bridging relation thereto and including a motor support projecting upwardly from said bridge bar; a motor mounted on said support and having a shaft projecting toward the major axis of said hopper; a flange mounted on said shaft and rotatable thereby; an eccentric plate having diametrically opposite extremities one of which has a mounting pivot connecting the same to said flange and the other of which is adjustable by swinging movement about said pivot; means for securing said eccentric plate to said flange in selected positions of said swinging adjustment, said bridge bar having a bearing coaxial with said major axis of the hopper; an actuator shaft extending vertically through said bridge bar and vertically reciprocable in said bearing; a pitman having an upper end pivoted to said eccentric plate on a pivot axis displaced from said mounting pivot and a lower end linked to the upper end of said actuator rod whereby to transmit variable-throw reciprocating movements thereto in accordance with the position of adjustment of said eccentric plate of said flange; a piston slidably fitted in said throat, said piston having a valve opening for flow of dough from said hopper into said throat, said piston being mounted on said rod above its lower end; a forming head slidably fitted in said nozzle and secured to the lower end of said rod in downwardly spaced relation to said piston; and valve means between said piston and forming head adapted to cooperate with the underside of said piston to close said valve opening in response to downward movement of said piston in said throat, whereby said piston is made effective to apply downward pressure to said body of dough, and to move away from said piston during upward movement of the latter so as to provide for downward flow of dough from said hopper through said valve opening into said throat to replenish said body of dough therein, said valve means comprising a flexible flap having an extremity secured to the central portion of said piston and a flexible body portion projecting radially outwardly beneath said valve opening and underlapping the marginal portions of said piston defining said opening.

References Cited by the Examiner
UNITED STATES PATENTS
2,881,716  4/1959  Belshaw _____ 107—148

WALTER A. SCHEEL, *Primary Examiner.*

J. SHEA, *Assistant Examiner.*